United States Patent [19]
Morimoto

[11] 3,954,673
[45] May 4, 1976

[54] PROCESS FOR PREPARING CATALYSTS FOR HYDRODESULFURIZATION

[75] Inventor: Tatsuo Morimoto, Yokohama, Japan

[73] Assignee: Chiyoda Kako Kensetsu Kabushiki Kaisha, Yokohama, Japan

[22] Filed: Feb. 1, 1972

[21] Appl. No.: 222,640

[30] Foreign Application Priority Data
Feb. 1, 1971   Japan.................................. 46-3946

[52] U.S. Cl................................. 252/465; 208/216
[51] Int. Cl.$^2$...................... B01J 21/04; B01J 23/88
[58] Field of Search...................... 252/465; 208/216

[56] References Cited
UNITED STATES PATENTS

| | | | |
|---|---|---|---|
| 3,075,915 | 1/1963 | Arnold et al.................... | 252/465 X |
| 3,383,301 | 5/1968 | Beuther et al.................. | 252/465 X |

Primary Examiner—W. J. Shine
Attorney, Agent, or Firm—Armstrong, Nikaido & Wegner

[57] ABSTRACT

A process for preparing catalysts for hydrodesulfurization which have fine pores sharply distributed in the range of 50 to 200A by the steps of adding a molybdate to a water soluble aluminum complex represented by the general formula $Al_n(OH)_m X_{3n-m}$ (wherein $n>1$, $3n>m$ and X is an anion) to obtain a uniform solution composition, treating the same hydrothermally, then adding a member selected from the group consisting of molybdenum and tungsten compounds and one or more members selected from the group consisting of iron, cobalt and nickel compounds, further adding and mixing with one or more members selected from the group consisting of polyvalent higher alcohols, high-molecular organic substances and amine group substances and then treating the mixture in such usual ways as drying, calcinating, grinding, moisture adjusting, molding, roasting and the like.

6 Claims, No Drawings

PROCESS FOR PREPARING CATALYSTS FOR HYDRODESULFURIZATION

The present invention relates to a process for preparing catalysts effective for the hydrodesulfurization of hydrocarbon oils. More particularly, it relates to a process for preparing catalysts effective for the hydrodesulfurization of hydrocarbon oils having suitable fine pores and consisting of alumina and the oxides of one or more metals selected from the group consisting of molybdenum, tungusten, iron, cobalt and nickel.

Although the catalysts prepared according to the process of the present invention are applicable to any hydrocarbon oil, whether light or heavy, they show the most superior effectiveness that has ever been seen particularly in the desulfurization of heavy oils.

Heretofore catalysts for hydrodesulfurization composed predominantly of alumina and oxides of cobalt, nickel and molybdenum have been prepared either by making granular or molded γ-alumina impregnated with an acidic or ammoniac aqueous solution containing such a salt as cobalt nitrate and nickel nitrate and such a salt as ammonium molybdate, or by mixing and kneading aluminum hydroxide gel with the solution of said salts or, otherwise, by coprecipitating a mixed solution consisting of a solution of a salt of aluminum and the solution of said salts by the help of alkali.

However these processes have a drawback that the aimed dispersion of the metals becomes uneven. In case of the impregnation process, it has been proposed by the invention under the Japanese Patent Publication No. 1891/1962 to use a Werner type complex compound of cobalt for achieving the uniform penetration of the metals into particles, which, however, involves many difficulties for lack of simplicity in operation. It is also said with the gel mixing process that the metals are not dispersed evenly but carried in the form of masses, and therefore are unable to exhibit sufficient activity.

In the coprecipitation process, similarly, the difference in the pH value optimum for precipitation between the metal ions constituting said salts results in the production of uneven precipitates and thereby makes the dispersiveness of the metals poorer. As a method of improving these drawbacks, we have previously proposed in the Japanese Patent Application No. 66,501/1968 (U.S. patent application Ser. No. 858,174, f.9/15/69 now abandoned) a process for preparing a dispersant consisting of alumina and a metal or a metal oxide by using an Al-metal-complex.

And yet, the pore size distribution of the catalyst offers a very important problem in the hydrodesulfurization of residue oils. This problem is associated with a fact that a considerable proportion of metals and sulfuric components contained in hydrocarbon oils are present in asphaltene. This means that with the progress of desulfurization to the higher level, the larger particles of asphaltene may be decomposed, thereby depositing nickel, vanadium and other metals — particularly vanadium — contained therein on the catalyst, which shortens its life by blocking up fine pores on the surface thereof.

The above-mentioned methods such as the impregnation process and the mixing of gel can normally provide only such catalysts as having fine pores of about 50A in diameter. As described later, there have also been several methods of producing carriers having larger fine pores than 50A; however they all have serious operational drawbacks. For example, particles of alumina are combined together by the action of various factors when they are being produced.

This invention consists in a process for preparing catalysts for hydrodesulfurization comprising the steps of adding a suitable quantity of a molybdate to a water soluble aluminum complex having the general formula $Al_n(OH)_m X_{3n-m}$ (wherein $n>1, 3n>m$ and X is an anion selected from the group consisting of $Cl^-$, $NO_3^-$, $I^-$, $Br^-$, $ClO_4^-$, and the like) to produce a uniform solution composition, treating the same hydrothermally, adding to the obtained slurry such members as are selected from the group consisting of molybdates and salts of cobalt, nickel, and iron that are necessary for providing the composition of the final catalyst, then adding a member of the group consisting of polyvalent higher alcohols, high-molecular organic substances and amine group substances and mixture thereof and treating the mixtures thus obtained by drying, calcinating, grinding, moisture adjusting, molding and roasting.

An object of the present invention is to provide the most effective pore size for the prevention of the deposition of nickel and vanadium on the catalyst in view of the fact that such precipitation and deposition that are considered to be responsible for the deterioration of the catalyst used in the desulfurization of hydrocarbon oils such as residue oils are largely dependent upon the size of the fine pores in the catalyst. Another object of the invention is to provide a method of preparation of such catalysts that consume only a small amount of $H_2$, that is, promote only desulfurization selectively without causing destructive hydrogenation, becuase $H_2$ constitutes an extremely large percentage of the cost of the desulfurization of hydrocarbon oils.

It is reported by Morikawa et al. (Journal of the Chemical Society of Japan, Industrial Chemistry Section, 64, 898 (1961) that the Ni carried on $Al_2O_3$ which is used in the hydrogenation of toluene shows a strong destructive activity if it is in such a form as NiO that is close to a free state and liable to be reduced, but, on the other hand, it shows a high hydrogenation power and very little destructive activity if it has been obtained by reducing slightly reducible nickel aluminate, being finely and evenly dispersed.

It is eaisly understood from the foregoing that the reactivity, selectivity and life of catalysts may vary remarkably with the processes and conditions by and under which they are produced.

By the above-mentioned process according to the Japanese Patent Application No. 66,501/1968, it is possible to produce dispersants whose constituents are dispersed evenly to a higher extent than ever, but only subject to the limitations that the peak diameter of pore size distribution available is about 60A or below. The peak diameter of about 50A offers no problem so far as the reaction with normal hydrocarbons is concerned, since the catalysts with pores of that size will react fully with them. In case of heavy oils, however, it has been found from the results of various reaction tests that if the constituents of the catalyst are diffused in a rate-determining step and the peak diameter of pore size distribution is small, metals are liable to deposit and penetrate the surface layer of the catalyst and block up the fine pores thereon because of the demetallization reaction of metal containing compounds and asphaltene contained in the above first mentioned oils.

On the other hand, with respect to desulfurization reaction, it was found from similar tests that the condition of dispersion, kind and quantity of the metals which improve the activity of surface are more important, since sufficient reaction activity can be attained if surface reaction is carried out in a rate-determining way and fine pores are larger than 50A. It was also found that devanadium reaction can be produced with more ease with an increase in the peak diameter of pore size distribution, which, however, will shorten the life of the catalyst since the deposition of vanadium will proceed faster than desulfurization.

Desulfurization reaction is governed by the reaction activity of the catalyst which is, in turn, dependent upon the condition of dispersion and the manner of adhesion of the metals. While it is evident that demetallization reaction which is considered to have a great influence on the life of the catalyst depends on the peak diameter of pore size distribution, that is, the larger the diameter becomes, the faster the reaction proceeds, from a viewpoint of the life of the calayst, there exists an optimum range of diameter extending from about 50 to 200A, particularly 70 to 150A.

Carriers having fine pores larger than 50A have heretofore been prepared by adding various kinds of additives to aluminum hydroxide gel, aging aluminum gel while drying, treating aluminum gel by steam or hydrolyzing an Al-alkoxide such as aluminum isopropoxide. All these processes have preventive steps against the consolidation of alumina particles which may be brought about by some temperature, atmospheric conditions, steam pressure or hydrophobicity at which they are produced.

As a result of an investigation on the conventional processes using an aluminum complex, it was found that the alumina obtained by simply calcinating the Al-complex is unsuitable for the purpose because of its smaller fine pores ranging in diameter from about 35 to 45A. So it was considered to adopt a well-reproducible hydrothermal treatment for enlarging the particles of the aluminum complex. However, when the diameter of fine pores in the aluminum complex thus treated was examined, it was also found that it ranges broadly from 35 to 1000A and, besides, the pore volume is small.

It is considered that this comes from the facts that the aluminum complex itself is composed of various molecules having different molecular weights and that the reaction of hydrothermal treatment is one of hydrolyzing reactions which do not proceed evenly when different molecules are involved.

A method has now been discovered for controlling such hydrolyzing reactions or, in other words, the fact that molybdenum compounds are effective for uniformly obtaining micro-crystals having a narrow colloidal range. Since the aluminum complex and the molybdenum compounds are positively and negatively charged, respectively, there may be some union or strong interaction between them. By adding the latter, the growth of the coagulated crystals of alumina hydrate in the aluminum complex can be prevented, thereby producing cyrstals of uniform size.

The following paragraphs describe in detail the manner in which the present invention is embodied.

A water soluble aluminum complex having the general formula of $Al_n(OH)_mX_{3n-m}$ (wherein $n>1$, $3n>m$ and X is a univalent anion such as $NO_3^-$, $Cl^-$, $Br^-$, $I^-$ and $ClO_4^-$) is normally used in the form of a solution containing 1 to 20%, preferably 2 to 10%, of $Al_2O_3$. A molybdate such as ammonium molybdate $(NH_4)_2MoO4$, sodium 2-molybdate $Na_2Mo_2O_7$, ammonium paramolybdate $(NH_4)_6Mo_7O_{24}\cdot 4H_2O$, sodium paramolybdate $Na_6Mo_7O_{24}\cdot 22H_2O$ and sodium 8-molybdate $Na_2Mo_8O_{25}\cdot 17H_2O$ is used in the form of an aqueous solution containing 2 to 20%, preferably 2 to 5%, of molybdenum by weight. By adding the latter in such a quantity that the molybdenum contained therein should correspond to 2 to 20%, preferably 3 to 14%, by weight of the $Al_2O_3$ contained in the solution of said complex and stirring the mixture at a temperature between the room temperature and 90°C for 10 to 60 minutes, a stable translucent soltuion composition is obtained.

This uniform solution is then poured into an autoclave made of stainless steel or lined with glass or titanium for hydrothermal treatment. The hydrothermal treatment is effected in the usual way; for example, at 120° to 330°C for 0.5 to 15 hours, preferably at 160° to 260°C for 1 to 5 hours. In consideration of the thermal conductivity of the autoclave, it is desirable to raise the temperature at a lower rate than 10°C per minute.

To cause the reaction to proceed more uniformly, it is also advisable to circulate part of the slurry once produced as the seed.

To the slurry thus obtained, a member selected from the group consisting of the compounds of molybdenum and tungsten which belong to the VI group of the periodic table and which are to be eventually contained in the catalyst as main catalyst component, and one or more members selected from the group consisting of the compounds of iron, cobalt and nickel belonging to the VIII group thereof, which are to be eventually contained in the catalyst as promotor, are added in the form of aqueous or ammoniac solutions, and then mixed and dispersed uniformly.

Desirable composition of the catalyst may consist of 5 to 20% of Mo, 0.1 to 10% of Ni, Co and Fe respectively, preferably 8 to 12% of Mo, 5 to 25% of W, 1 to 7% of Ni and 1 to 5% of Co and Fe, respectively by weight The molybdenum compound used here is that such as ammonium molybdate, ammonium paramolybdate and sodium molybdate, and the tungsten compound used here is that such as sodium tungstate, ammonium paratungstate, sodium paratungstate. The above mentioned compounds are all soluble in water, aqueous ammonia and aqueous alcohol. On the other hand, the compounds of cobalt and nickel may be one of such salts as their nitrates, chlorides, sulfates, acetates and oxalates that are also soluble in water, aqueous ammonia and aqueous alcohol, respectively.

It is also possible to use nickel carbontes or nickel oxides and cobalt carbonates or cobalt oxides by suspending their fine powders.

What remarkably distinguishes the present process whereby the extrudated catalyst is produced by using an evenly dispersed slurry obtained by adding, as described above, the catalyst metals and a third substance to be described later to the hydrothermally treated product from the conventional processes is that the former does not include the steps of filtering and washing.

In the first place, the slurry thus obtained is dried at 80° to 120°C by means of the stationary drier, spray drier, etc., and then the moisture thereof is adjusted as such and the product is molded into a desired shape by the tablet machine, extrusion machine or rolling granulator. The molded product is then dried at 60° to 90°C for 1 to 10 hours, and further roasted in the rotary kiln, tunnel kiln or box-type roasting furnace at 300° to 700° C for 1 to 15 hours, preferably at 400° to 600° C for 2 to 10 hours.

As compared with the catalysts obtained from the hydrothermally treated product added with no molybdenum, the catalyst obtained from the above-described process possesses pore size whose volume is sharply distributed in a predetermined range. That is to say, in the absence of molybdenum, pore size is distributed evently in the range of 35 to 1000A. But when as much molybdenum as corresponds to 4% by weight of alumina is added, the distribution range is restricted to 50 to 200A, and when the quantity of molybdenum is increased to 10.5% by weight the range is further narrowed to 50 to 100A. The more molybdenum is added, the sharper the pore size distribution range becomes and also the smaller the peak diameter becomes. By adding a suitable quantity of molybdenum, it is possible to select a desired range of pore size distribution and a desired peak diameter. Therefore, in case of the desulfurization of heavy oils wherein the pore size distribution matters as described before, it is possible to obtain a catalyst whose pore size is sharply distributed in the range of such relatively larger sizes as 70 to 150A by decreasing the quantity of molybdenum compounds to be added. In desulfurizing light oils, on the other hand, the catalyst with relatively smaller fine pores may serve the purpose as is generally known. According to the present invention, it is also possible to obtain such a catalyst whose fine pores are distributed in the range extending from 50 to 70A by increasing the quantity of molybdenum compounds to be added. This process differs from the conventional gel mixing process not only in that it can disperse the catalyst metals evenly but also in the following point. That is to say, in case of the conventional gel mixing process which consists of adding salts of the metals to fresh or aged gel, the metals may be carried unevenly, no uniformly dispersed catalyst may be obtained since the alumina particles consitituting the gel will change with the elapse of time and considerable amount of the carrier alumina and added metals may be combined together. In case of the present process, it is considered that any strong conbination of the catalyst metals and the carrier can be prevented because very fine boehmite-like crystals are evenly produced by the hydrothermal treatment.

During the drying step in the above-mentioned preparation process, there occurs the aggregation of particles due to the surface tension of the water screen produced by the action of dehydration so that the total capacity of fine pores is reduced. To improve this, a thrid substance is usually added, which, however, mostly exercises no other effects than a physical intervening effect and therefore does not reduce the surface tension so much.

Generally, for example, one or more members selected from the group consisting of polyvalent higher alcohols such as diethylene glycol, glycerin and polyethylene glycol and the group consisting of high molecular organic compounds such as carboxymethylcellulose and Avicell (microcrystalline cellulose) is added in an amount equivalent to 20 to 200% by weight of $Al_2O_3$ to increase the total pore volume.

Addition of a member selected from the group consisting of amine group substances such as hexamethylene tetramine, azodicarbonamide and dinitrosopentamethylene tetramine also exercises a special effect which has not been known before. Such a substance also may be added in an amount equivalent to 20 to 200% by weight, preferably 50 to 100%, of $Al_2O_3$. It may be added either in the form of an aqueous solution or in the form of a solid; in the latter case the solid is allowed to dissolve in the slurry. Timing of addition should preferably be so selected that it will be added to the hydrothermally treated slurry, usually subsequent to the addition of the catalyst metals and followed by the drying step.

Said special effect achieved by the addition of the above-mentioned amine group substance consists of gelation, generation of heat, foaming and dehydration, so that the dehydrated catalysts can be obtained with ease by calcinating the mixture at a very low temperature.

Take, as an example, hexamethylene tetramine to illustrate the action of said amine group substance. Since it is a weak base, hexamethylene tetramine can gelate the hydrothemally treated slightly acidic slurry by neutralizing and also can neutralize the salts of added catalyst metals into hydrates and further cogelate the same with alumina and slurry which will eventually become the carrier. As the drying of the slurry proceeds and the temperature reaches 50° to 200° C, foaming and rapid dehydration take place following abrupt generation of heat, which temporarily reaches 400° to 500° C, and then an amorphous powdery catalyst can be produced at once.

It is not evident why such a process takes place. But it is supposed that this phenomenon may be brought about by the catalyst metals which result from the reduction of their oxides caused by a large quantity of formaldehyde produced by the abrupt decomposition of hexamethylene tetramine.

When such a third substance is added, the total pore volume is enlarged throughout the whole size range, which results in the production of macro pore size larger than 500A that generally reduce the strength of the molded product remarkably. Since such macro pore size is unsuitable for desulfurization, the product is dried, calcinated and ground to obtain smaller pore size in the range of 50 to 200A.

Calcination may be effected at 200° to 400° C for 1 to 10 hours in the rotary kiln or box-type roasting furnace while raising the temperature at a rate of 5° C or less per minute.

Grinding after roasting may be carried out either by a dry or wet method. In case of the wet method, the product will be ground with some water to the level of $10\mu$ or lower in a ball mill or other means.

After adjusting the mositure content, the ground product is molded into desired shape and size by means of the extrusion molder, tablet machine or rolling granulator. By the above-mentioned steps, almost all the macro pore size larger than 500A that are produced by the addition of a third substance are extinguished to produce the catalysts suitable for the desulfurization reaction whose pore size is concentratedly distributed in the range of 50 to 200A.

The catalyst metals may be added not only in the abovementioned manner but also by such timings as described below.

1. The catalyst metals may be added after the preparation of a uniformly mixed solution containing the aluminum complex and molybdenum compound and then the mixture will be hydrothermally treated;

2. The catalyst metals may be added after calcination in the form of a solution and then the mixture will be ground; or
3. The catalyst metals may be impregnated in $Al_2O_3$—$MoO_3$ which is obtained by roasting the molded product withoout adding the catalyst metals and serves like a usual carrier.

As fully described above, the process according to the present invention is capable of providing a high dispersibility of the metals which contribute to the desulfurization reaction and, at the same time, producing catalysts whose pore size is distributed in such a range are effective against the devanadium reaction which serves as a factor the deteriorates the catalyst particularly when it is used in desulfurizing heavy oils.

Furthermore, the process of preparation itself is much more improved that those of the conventional processes. In addition to the precipitating process, other conventional processes also require the steps of precipitating, filtering and washing, which makes the entire process complicated, necessitates a great deal of time, reduces the yield of products and makes the reproducibility of the property and activity of the products unobtainable.

By improving such prior art processes by eliminating the steps of precipitating, filtering and washing, simplifying the roasting step into a single stage and making the entire preparation process continuous to facilitate quality control, the present invention provides a new process which is not only quite different from the conventional processes but also has a high industrial value.

Now the present invention will be further illustrated by the following non-limitative examples.

EXAMPLE 1

286 parts of an aqueous solution containing 17.5% by weight (as $Al_2O_3$) of an Al-complex having the analytical composition of $Al_{14}(OH)_{40}(NO_3)_2$ and an aqueous solution of 4.3 parts of $(NH_4)_6 \cdot Mo_7O_{24} \cdot 4H_2O$ is dissolved in 710 parts of water were mixed together. The mixture was hydrothermally treated in an autoclave of stainless steel at 200° C for 10 hours. To the sol thus produced, an aqueous solution made by dissolving 18 parts of $Ni(NO_3)_2 \cdot 6H_2O$ in 50 parts of water was added, and 150 parts of a 20 wt% hexamethylene tetramine solution was added to the mixture and vigorously stirred. After drying, this sol was kept at 180° C until it became powdery through an explosive reaction and then ground into a finer powder by a ball mill. After adjusting the mositure content, this powder was molded into tubular products having a diameter of 1.6 mm by means of an extruder. The extruded products were air-dired for 20 hours and then roasted at 400° C for 12 hours. The catalyst thus obtained indicated a specific surface area of 179 m²/g, a total pore volume of 0.471 cc/g, and its pore size was distributed as follows.

| 0 – 50A | 3% |
|---|---|
| 50 – 75 | 18 |
| 75 – 150 | 62 |
| 150 – 200 | 3 |
| 200 – 300 | 4 |
| 300 – | 9 |

COMPARATIVE EXAMPLE

For the purpose of comparison, the following catalyst was produced by a process in which no molybdenum was added when the product was hydrothermally treated.

When 1000 parts of an aqueous solution containing 5.0% by weight (as $Al_2O_3$) of an Al-complex having the analytical composition of $Al_{14}(OH)_{40}(NO_3)_2$ was hydrothermally treated at 200° c for 5 hours, the solution having a pH of 4.4 was changed into a white sol having a pH of 2.1. After adding 18 parts of $Ni(NO_3)_2 \cdot 6H_2O$ and 10 parts of $Co(NO_3)_2 \cdot 6H_2O$, 150 parts of a 30 wt% hexamethylene tetramine solution was further added, and the mixture was vigorously stirred and mixed. The pH of the mixture was then found to be 4.4. This sol was dried and then calcinated at 180° C. And the gel so obtained was wet-ground and molded by the extruder. The molded products were air-dried for 48 hours and roasted at 480° C for 5 hours. The catalyst thus obtained showed a specific surface area of 188 m²/g, a total pore volume of 0.452 cc/g, and its pore size was distributed as broadly as tabulated below.

| 0 – 50A | 12% |
|---|---|
| 50 – 75 | 13 |
| 75 – 150 | 24 |
| 150 – 200 | 7 |
| 200 – 300 | 11 |
| 300 – | 33 |

EXAMPLE 2

To 1000 parts of an aqueous solution containing 5% by weight (as $Al_2O_3$0 of an Al-complex having the analytical composition of $Al_{14}(OH)_{40}(NO_3)_2$, 13 parts of $(NH_4)_6Mo_7O_{24}/$(which $/ \cdot 4H_2O$ corresponds to as much Mo as is equivalent to 14% by weight of $Al_2O_3$) was added and vigorously stirred and mixed to obtain a translucent solution. This solution indicated a pH of 4.5. When hydrothermally treated at 230° C for 3 hours in the stainless steel autoclave, this solution turned into a white opaque sol. The pH of this sol was 1.1. This sol was mixed with an aqueous solution consisting of 50 parts of water into which 18 parts of $Ni(NO_3)_2 \cdot 6H_2O$ and 10 parts of $Co(NO_3)_2 \cdot 6H_2O$ were dissolved, and then 150 parts of a 30 wt% hexamethylene tetramine solution was added to the mixture and vigorously stirred. This sol indicated a pH of 5.0. And this sol was dried at 80° C for 10 hours in the drier and then calcinated at 200° C. After confirming the vigorous evolution of gases, the sol was ground by the powdering machine until an average particle diameter of 10μ was attained. After adjusting the moisture content, this powder was molded by the extruder using a die of 1.6 mm diameter. The product was air-dried for 3 days and then roasted at 500° C for 3 hours. This catalyst indicated a specific surface area of 274 m²/g and a total pore volume of 0.540 cc/g, and its pore size was distributed as shown below.

| 0 – 50A | 9% |
|---|---|
| 50 – 75 | 22 |
| 75 – 150 | 58 |
| 150 – 200 | 3 |
| 200 – 300 | 4 |

-continued

| | |
|---|---|
| 300 – | 4 |

50 cc of the catalyst of this invention is fed to a stainless reaction tube having 14φ of diameter and 400 mm of length and sulfurized under the following conditions:
  Temp. — 350° C
  Time — 3 Hours
  Pressure — 99 kg/cm²G
  Oil feed — Gas oil f DTB (3 wt% as sulfur) (DTB means ditertiary butyl disulfide)
  H2/oil — 1000 Nl/1
  LHSV — 1.0 hr⁻¹
  (liquid houry space velocity)

Next, Khafji topping residual oil containing 3.75 wt% of sulfur, 80 ppm of vanadium and 20 ppm of Ni is supplied thereinto and the whole is treated for 100 hours under the following reaction conditions:
  Temp. — 370° C
  Pressure — 99 kg/m²G
  H₂/oil — 1000 Nl/1
  LHSV — 1 hr⁻¹

After that, the temperature is raised up to 420° C and the reaction was continued for eight hundred hours. Then, the sulfur portion in the produced oil is measured according to Recosulfur determinator. The determinator indicated the value of less than 1.4 weight% of sulfur, the catalyst remaining active over a long period of time.

EXAMPLE 3

286 parts of a solution containing 17.5% by weight (as Al₂O₃) of an Al-complex having the analytical composition of Al₁₄(OH)₄₀(NO₃)₂ and a solution wherein 4.8 parts of (NH₄)₂MoO₄ (which corresponds to Mo equivalent to 4.7% by weight of Al₂O₃) is dissolved in 709 parts of distilled water were mixed, and the mixture was hydrothermally treated in the autoclave of stainless steel at 230° for 2 hours. The product was a white opaque sol. To this sol, a solution prepared by dissolving 9.6 parts of (NH₄)₂.MoO₄ in 100 parts of water was added, and then a solution prepared by dissolving 11 parts of CoCl₂.6H₂O in 40 parts of water was further added, and the mixture was mixed with 150 parts of a 30 wt% glycerin solution and vigorously stirred. After drying at 70° C for 6 hours, the mixture was/ dried at 120° C for 3 hours and then/ further calcinated at 300° C for 3 hours. This calcinated product, which contains carboneous matter, assumed a brown color. This was wet-ground by the powdering machine, dried the moisture content reaches a suitable level and then molded by the extruder. The molded products were allowed to stand for a long time at the room temperature, and then roasted at 550° C for 4 hours. This catalyst assumed a deep blue color and indicated a specific surface area of 170 m²/g and a total pore volume of 0.545 cc/g. And its pore size was distributed as shown below.

| | |
|---|---|
| 0 – 50A | 2% |
| 50 – 75 | 15 |
| 75 – 150 | 58 |
| 150 – 200 | 10 |
| 200 – 300 | 5 |
| 300 – | 10 |

50 cc of the ctatlyst of this invention is fed to the reaction device (tube) which is same with that in the above Example 2, and sulfurized under the same sulfurization conditions, then, the Khafji topping residual oil is treated just like that in the above Example 2. The desulfurization rate after 1000 hours was 64% and the catalyst functioned in a desirable manner.

EXAMPLE 4

To 500 parts of a solution containing 10% by weight of an Al-complex having the analytical composition of Al₁₄(OH)₄₀ (NO₃)₂, a solution prepared by dissolving 6.1 parts of (NH₄)₆Mo₇O₂₄.4H₂O in 494 parts of water was added and mixed well. This mixed solution indicated a pH of 4.4 at 22° C. When it was hyrothermally treated at 230° for 3 hours in the autoclave of stainless steel, a sol having white opaque luster was obtained. The pH of this sol was 1.2. After adding thereto a solution prepared by dissolving 69 parts of (NH₄)₆Mo₇O₂₄.4H₂O in 70 parts of water, 400 parts of a 25 wt% hexamethylene tetramine solution was further added and stirred therewith. This sol was dried in the drier at 80° C for 10 hours, and then calcinated at 230° C for 2 hours. When the temperature reached 180° C while being raised, it showed an explosive exothermic reaction accompanied by an offensive smell given out by the amine group compound. The gel thus obtained assumed a blackish brown or brown color This sol had no more water of crystallization than 5 % and was found to be amorphous when studied by the X-ray. This gel was then ground with 180 parts of a solution obtained by dissolving 25 parts of Ni(NO₃)₂.6-H₂O in water. When it became a viscous slurry with the evaporation water, it was dried in a suitable manner and then molded by the extruder. The extruded products were air-dried for 2 days and then calcinated at 485° C for 6 hours.

This catalyst assumed a light green color and indicated a specific surface area of 274 m²/g and a total pore volume of 0.535 cc/g, and its pore size was distributed as shown below.

| | |
|---|---|
| 0 – 50A | 10% |
| 50 – 75 | 26 |
| 75 – 150 | 52 |
| 150 – 200 | 6 |
| 200 – 300 | 1 |
| 300 – | 5 |

A reaction experiment was done by employing exactly the same device as the reaction device used in the above Example 2 employing 50 cc of the catalyst of this invention. The desulfurization conditions are identical with those in the above Example 2. The reaction was continued in such a manner that the desulfurization rate was 65% by raising the temperature a little by little 3–5° C at a time. As far as the result is concerned, it took more than 1500 hours for raising the reaction temperature up to 420° C, and exhibited good catalytic activity.

EXAMPLE 5

To 286 parts of an aqueous solution containing 17.5% by weight (as Al₂O₃) of an Al-complex having the analytical composition of Al₁₄(OH)₄₀(NO₃)₂, 714 parts of an aqueous solution prepared by dissolving 13 parts of (NH₄)₆Mo₄O₂₄. 4H₂O in water was added and vigorously stirred. This mixed solution was poured into the atuoclave of stainless steel and hydrothermally treated at 230° C for 4 hours. A white opaque sol thus obtained was mixed with a solution prepared by dissolving 9 parts of $NiSO_4.6H_2O$ and 6 parts of $CoSO_4.6H_2O$ in 35 parts of water, and then 100 parts of a 30 wt% polyethylene glycol (having an average molecular weight of 1,000) solution was added to the mixture and vigorously stirred. This unifrom sol was dried by the spray drier at an inlet temperature of 350° C and an outlet temperature of 80° C, and then calcinated at 300° C for 5 hours. A brown gel thus obtained was wet-ground by the ball mill until the particles sufficiently suitable for molding were obtained. Then, afer adjusting the moisture content to a suitable level, it was molded by the extruder. The extruded products were air-dired for 11 hours, and then roasted at 500° C for 3 hours. The catalyst thus produced assumed a dark blue color and indicated a specific surface area of 298 m²/g and a total pore volume of 0.456 cc/g, and its pore size was distributed as shown below.

| | |
|---|---|
| 0 – 50A | 20% |
| 50 – 75 | 39 |
| 75 – 150 | 27 |
| 150 – 200 | 5 |
| 200 – 300 | 2 |
| 300 – | 7 |

EXAMPLE 6

114 parts of an aqueous solution containing 17.5% by weight (as $Al_2O_3$) of an Al-complex having the analytical composition of $Al_{14}(OH)_{40}(NO_3)_2$ and another aqueous solution prepared by dissolving 5 parts of $(NH_4)_6.Mo_7O_{24}.4H_2O$ in 881 parts of water were mixed together. This mixed solution showed a pH of 4.4. This was poured into the autoclave of stainless steel and hydrothermally treated at 230° C for 3.5 hours. An opaque colloidal solution thus produced indicated a pH of 1.3. To this, an aqueous solution prepared by dissolving 7 parts of $Ni(NO_3)_2.6H_2O$ and 4 parts of $Co(NO_3)_2.6H_2O$ in 20 parts of water was added, and then 100 parts of a 30 wt% hexamethylene tetramine solution was further added and stirred well. The substance which assumed the form of solution was turned by hexamethylene tetramine into the form of sol. And the sol thus obtained indicated a pH of 4.7. This sol was dired in the drier at 70° C for 15 hours, and then calcinated at 200° C for 7 hours. At this time, some parts of the sol could momentarily attain a temperature beyond 400° C because of an exothermic reaction accompanied by the instantaneous dehydration and the evolution of a large quantity of gases. A blackish brown gel so produced was ground by the powdering machine into the particles having an average diameter of 10μ. After adding a suitable amount of water and allowing to stand for a week, the product was molded by the extruder into tubular pellets having a diameter of 1.6 mm. After drying, they were roasted at 600° C for 2 hours. The catalyst thus prepared indicated a specific surface area of 185 m²/g and a total pore volume of 0.621 cc/g, and its pore size was distributed as shown below.

| | |
|---|---|
| 0 – 50A | 6% |
| 50 – 75 | 11 |
| 75 – 150 | 43 |
| 150 – 200 | 20% |
| 200 – 300 | 6 |
| 300 – | 14 |

EXAMPLE 7

286 parts of an aqueous solution containing 17.5 % by weight (as $Al_2O_3$) of an Al-complex having the analytical composition of $Al_{14}(OH)_{40}(NO_3)_2$ and another aqueous solution prepared by dissolving 13 parts of $(NH_4)_6Mo_7O_{24}.4H_2O$ in 701 parts of water were mixed together, and the mixture was poured into the autoclave of stainless steel and hydrothermally treated at 290° C for 3 hours. The mixture before treatment showed a pH of 3.4, while the product of treatment, which was a white opaque sol, indicated a pH of 0.5. To this sol, a total amount of an aqueous solution prepared by dissolving 18 parts of $Ni(NO_3)_2.6H_2O$ and 10 parts of $Co(NO_3)_2.6H_2O$ in 50 parts of water was added, and then 450 parts of a 10 wt% hexamethylene tetramine solution was added and stirred vigorously. This sol showed a pH of 3.4. After drying at 80° C for 5 hours, this sol was calcinated at 200° C. After confirming an abrupt exothermic reaction around 180° C, it was maintained at 200° C for an hour. The gel-power-like product thus obtained was ground with a suitable amount of water. When it was ground to fine particles, it was molded by the extruder after adjusting the moisture content. The molded products were dried in the hot air circulating drier at 50° C for 10 hours and then calcinated at 550° C for 4 hours. This catalyst indicated a specific surface area of 272 m²/g and a total pore volume of 0.660 cc/g, and its pore size was distributed as shown below.

| | |
|---|---|
| 0 – 50A | 8% |
| 50 – 75 | 10 |
| 75 – 150 | 51% |
| 150 – 200 | 10 |
| 200 – 300 | 4 |
| 300 – | 17 |

EXAMPLE 8

To 286 parts of an aqueous solution containing 17.5 % by weight (as $Al_2O_3$) of an Al-complex having the analytical composition of $Al_{14}(OH)_{40}(NO_3)_2$, 13 parts of $(NH_4)_6Mo_7O_{24}.4H_2O$ was added and vigorously stirred. By hydrothermally treating this solution at 160° C for 6 hours in the autoclave of glass, a white lustrous sol was obtained. To this sol, a total amount of an aqueous solution prepared by dissolving 18 parts of $Ni(NO_3)_2.6H_2O$ and 10 parts of $Co(NO_3)_2.6H_2O$ in 50 parts of water was added and then 150 parts of a 30 wt% hexamethylene tetramine solution was added and stirred well. After drying in the drier, this sol was further dried in the electric furnace kept at 180° C until an explosive evolution of exothermic gas takes place. After grinding and adjusting the moisture content, the product was molded by the extruder. The extruder product was air-dried, and then roasted at 500° C for 3 hours. This catalyst indicated a specific surface area of 310 m²/g and a total pore volume of 0.40 cc/g, and its pore size was distributed as shown below.

| | |
|---|---|
| 0 – 50A | 25% |
| 50 – 75 | 40 |
| 75 – 150 | 12 |
| 150 – 200 | 3 |
| 200 – 300 | 2 |
| 300 – | 18 |

50 cc of the catalyst of this invention is fed to the reaction device which is same as that of the Example 2 and desulfurization experiment of the Khafji topping residual oil was carried out under the same conditions with those of the Example 4. It required 1000 hours till the temperature reached 400° C.

EXAMPLE 9

266 parts of an aqueous solution containing 18.8 % by weight (as $Al_2O_3$) of an Al-complex having the analytical compositioin of $Al_8(OH)_{20}Cl_4$ and another aqueous solution prepared by dissolving 13 parts of $(NH_4)_6Mo_7O_{24} \cdot 4H_2O$ in 721 parts of water were mixed well, and the mixture was hydrothermally treated at 180° C for 4 hours in the autoclave of glass. To a white opaque gel thus produced, an aqueous solution prepared by dissolving 14 parts of $NiCl_2 \cdot 6H_2O$ and 14 parts of $Co_2 \cdot 6H_2O$ in 50 parts of water was added, and then 150 parts of a 30 wt% polyethylene glycol (having a molecular weight of 1,000) solution was added and stirred well. After sufficiently drying the viscous sol-like product at 80° C in the drier, it was further calcinated at 300° C for 2 hours. The brown gel-like product thus obtained was ground with an equivalent amount of water in the powering machine until sufficiently small particles were obtained. Then the product was dried for some time, and then molded by the extruder. The molded product was allowed to satnd for 48 hours, and then roasted at 550° C for 2 hours. The catalyst thus obtained indicated a specific surface area of 302 m²/g and a total pore volume of 0.572 cc/g, and its pore size was distributed as shown below.

| | |
|---|---|
| 0 – 50A | 7% |
| 50 – 75 | 26 |
| 75 – 150 | 46 |
| 150 – 200 | 7 |
| 200 – 300 | 6 |
| 300 – | 8 |

In each of the above examples, the catalyst prepared without adding a molybdate to an aluminum complex indicated a broad distribution on the larger side of the pore diameter range.

In connection with Examples 1, 5-7 and 9, although we omitted in mentioning the effect of desulfurization experiment of hydrocarbon oil by using the catalyst obtained in each of the Examples, it could be recognized that in all of the Examples, the catalysts have excellent activity and durability.

What I claim is:

1. A process for preparing a hydrodesulfurization catalyst which has fine pores sharply distributed in the range og 50 to 200 A which comprises
   i. adding a molybdate to a water-soluble aluminum complex represented by the formula $Al_n(OH)_m X_{3n-m}$ wherein $n>1$, $3n>m$ and X is an anion selected from the group consisting of Cl, $NO_3$, I, Br and $ClO_4$ whereby there is obtained a uniform solution composition;
   ii. treating the resulting composition hydrothermally at a temperature on the order of from about 120° to about 330° C;
   iii. adding thereto a water soluble salt of molybdenum or tungsten and at least one member selected from the group consisting of water soluble salts of iron, cobalt or nickel;
   iv. further adding thereto and mixing at least one member selected from the group consisting of diethylene glycol, carboxymethyl-cellulose, glycerin, polyethylene glycol, microcrystalline cellulose, hexamethylene tetramine, azodicarbonamide and dinitrosopentamethylene tetramine; and
   v. treating the resultant mixture by drying and calcinating whereby said catalyst is obtained.

2. A process according to claim 1 wherein the pore diameter of the catalyst is distributed in the range of 70 – 150A.

3. A process according to claim 1 wherein said molybdate is a member selected from a group consisting of ammonium molybdate, sodium 1-molybdate, sodium 2-molybdate, ammonium paramolybdate, sodium paramolybdate and sodium 8-molybdate.

4. A process according to claim 1 wherein said molybdate compound is a member selected from a group consisting of ammonium molybdate, sodium molybdate, ammonium paramolybdate, and sodium paramolybdate.

5. A process according to claim 1 wherein said nickel compound is a member selected from a group consisting of nitrates, chlorides, sulfates, acetates oxalates, carbonates and oxides of nickel.

6. A process according to claim 1 wherein said cobalt compound is a member selected from a group consisting of nitrates, chlorides, sulfates, acetates, oxalates, carbonates and oxides of cobalt.

* * * * *